US012602205B2

(12) United States Patent
Robinson et al.

(10) Patent No.: US 12,602,205 B2
(45) Date of Patent: Apr. 14, 2026

(54) EXTERNALLY-INITIATED RUNTIME TYPE EXTENSION

(71) Applicant: Microsoft Technology Licensing, LLC, Redmond, WA (US)

(72) Inventors: Aaron Reid Robinson, Seattle, WA (US); Vit Karas, Svojetice (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 17/740,267

(22) Filed: May 9, 2022

(65) Prior Publication Data

US 2023/0359440 A1 Nov. 9, 2023

(51) Int. Cl.
| | |
|---|---|
| G06F 8/30 | (2018.01) |
| G06F 8/65 | (2018.01) |
| G06F 9/448 | (2018.01) |

(52) U.S. Cl.
CPC ..................................... G06F 8/30 (2013.01)

(58) Field of Classification Search
CPC ..... G06F 8/30; G06F 8/31; G06F 8/65; G06F 9/448
See application file for complete search history.

(56) References Cited

U.S. PATENT DOCUMENTS

| | | | | | |
|---|---|---|---|---|---|
| 2007/0050168 | A1* | 3/2007 | Meijer | ................. | G06F 9/4492 |
| | | | | | 702/119 |
| 2008/0059949 | A1* | 3/2008 | Matic | ....................... | G06F 8/24 |
| | | | | | 717/108 |
| 2009/0234804 | A1 | 9/2009 | Whitechapel et al. | | |
| 2012/0079474 | A1* | 3/2012 | Gold | ......................... | G06F 8/63 |
| | | | | | 717/173 |
| 2013/0339926 | A1* | 12/2013 | Raundahl Gregersen | ................... | |
| | | | | | G06F 8/31 |
| | | | | | 717/114 |
| 2014/0019936 | A1* | 1/2014 | Cohanoff | .................. | G06F 8/30 |
| | | | | | 717/115 |
| 2014/0157231 | A1* | 6/2014 | Cai | ......................... | G06F 8/656 |
| | | | | | 717/110 |
| 2017/0123963 | A1* | 5/2017 | Koren | ................. | G06F 11/3688 |
| 2017/0177664 | A1* | 6/2017 | Ma | ............................. | G06F 8/43 |
| 2022/0137944 | A1* | 5/2022 | Patterson | .................. | G06F 8/65 |

OTHER PUBLICATIONS ("Component Architecture with Runtime Type Definition", Grinkrug et al, Sep. 27, 2010) (Year: 2010).*

(Continued)

*Primary Examiner* — Noor Alkhateeb
(74) *Attorney, Agent, or Firm* — Workman Nydegger

(57) ABSTRACT

Externally-initiated extension of a type that is managed by a runtime environment. As an example, third-party code that is not a runtime component may itself cause a type to be extended by causing a subject interface to be supplied to the type while also providing an implementation for that interface. The extension occurs by identifying a subject interface to supply to a type that is managed by the runtime environment, providing an implementation of the interface to the runtime environment, and instructing the runtime environment to supply the subject interface to the type using the implementation. The interface is thereafter available to computing entities that use the type.

20 Claims, 6 Drawing Sheets

100

(56) References Cited

OTHER PUBLICATIONS

"IDynamicInterfaceCastable Interface", Retrieved From: https://web.archive.org/web/20220109004704/https://docs.microsoft.com/en-us/dotnet/api/system.runtime.interopservices.idynamicinterfacecastable?view=net-6.0, Jan. 9, 2022, 2 Pages.

Asaduzzaman, et al., "FEMIR: A Tool for Recommending Framework Extension Examples", In Proceedings of 32nd IEEE/ACM International Conference on Automated Software Engineering, Oct. 2017, pp. 967-972.

"International Search Report and Written Opinion Issued in PCT Application No. PCT/US23/013576", Mailed Date: May 25, 2023, 15 Pages.

Communication pursuant to Article 94(3) EPC Received in European Patent Application No. 23712120.7, mailed on Jan. 26, 2026, 15 pages.

* cited by examiner

EXTERNALLY-INITIATED RUNTIME TYPE EXTENSION

BACKGROUND

A software development framework is a platform (or set of tools) for the development and execution of computer-executable code, such as programs and applications. A framework may include a runtime that serves as an execution engine for code. A framework may also include a class library, sometimes referred to as a "framework class library". As an example, the .NET Framework and JAVA each have framework class libraries that define types that are inherently available for use when developing code at development time, and running code at runtime.

Some runtimes are strongly typed in that the types are statically defined by the runtime as they relate to each other. A type that is defined by the runtime is referred to herein as a "runtime type". Once a type is defined and is accepted by the runtime, the type is immutable at the type relates to other types. There may be a mechanism to create new types, but there is not a mechanism to enrich an existing type with more information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with the principles described herein, a type that is managed by a runtime environment is extendible by a component that is external to the runtime environment. As an example, third-party code that is not a runtime component may itself cause a type to be extended by causing a subject interface to be supplied to the type while also providing an implementation for that interface. The extension occurs by identifying a subject interface to supply to a type that is managed by the runtime environment, providing an implementation of the interface to the runtime environment, and instructing the runtime environment supply the subject interface to the type using the implementation. The interface is thereafter available for other entities to use as a subject interface of that type.

Thus, an external component that has an implementation of a subject interface may itself extend a type managed by the runtime environment, without waiting for the runtime itself to extend the type, which may never happen. Furthermore, the interface is thereafter available to computing entities that use the type. Accordingly, using the principles described herein, the capabilities of the runtime environment are enhanced over time, especially when numerous types are extended with further functionality.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

In accordance with the principles described herein, a type that is managed by a runtime environment is extendible by a component that is external to the runtime environment. As an example, third-party code that is not a runtime component may itself cause a type to be extended by causing a subject interface to be supplied to the type while also providing an implementation for that interface. The extension occurs by identifying interface to supply to a type that is managed by the runtime environment, providing an implementation of the interface to the runtime environment, and instructing the runtime environment to supply the subject interface to the type using the implementation. The interface is thereafter available for other entities to use as a subject interface of that type. Herein, an "interface" is any mechanism to communicate and may include zero or more functions.

Thus, an external component that has an implementation of a subject interface may itself extend a type managed by the runtime environment, without waiting for the runtime itself to extend the type, which may never happen. Furthermore, the interface is thereafter available to computing entities that use the type. Accordingly, using the principles described herein, the capabilities of the runtime environment are enhanced over time, especially when numerous types are extended with further functionality.

Figure 1:
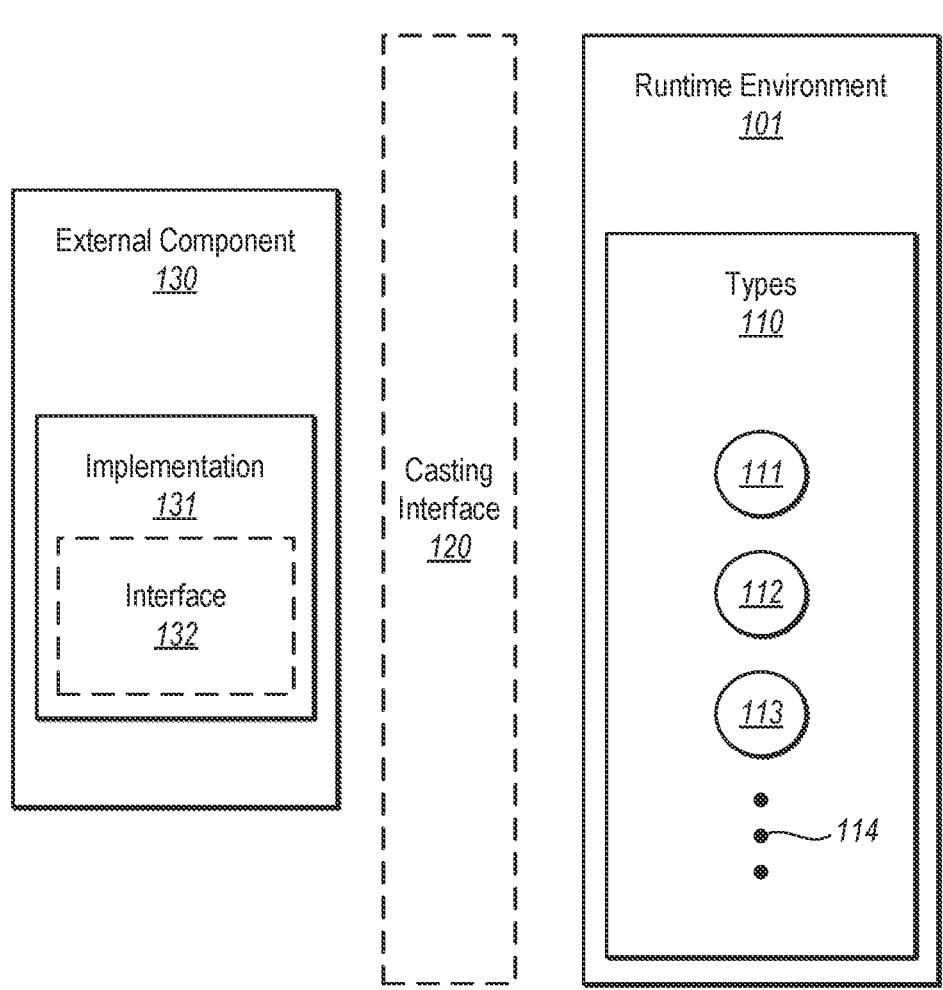
FIG. 1 illustrates a network environment in which the principles described herein may be employed, and that includes a runtime environment and an interface casting interface through which an external component can communicate with the runtime environment, in accordance with the principles described herein.

FIG. 1 illustrates an environment 100 in which the principles described herein may be practiced. The environment 100 includes a runtime environment 101 and an interface casting interface 120 through which an external component 130 can communicate with the runtime environment 101. The external component 130 has access to an implementation 131, which the runtime environment can use to supply a subject interface 132 to a type managed by the runtime environment 101, or cause a subject interface 132 to be executed as a subject interface of a type managed by the runtime environment 101. As an example, suppose that the external component 130 is owned by a print service. In that case, the external component 130 may have an implementation that may be executed in order to supply a print interface to types managed by the runtime environment. In order to clearly distinguish between the interface that is to be supplied and the interface casting interface 120, the interface that is to be supplied will be hereinafter referred to as the "subject interface"

The runtime environment 101 includes multiple types 110 that are managed by the runtime environment 101. In the illustrated example, the types 110 include three types 111, 112 and 113, each illustrated symbolically as a circle. A typical runtime environment could include many types. However, in the example of FIG. 1, such a few number of types is selected for purposes of simplicity only. Accordingly, the ellipsis 114 represents that the runtime environment 101 could manage many or even innumerable types.

Each of the types 110 may be part of a class library that is shared by multiple applications that use the runtime environment 101. Accordingly, the "types" may also be referred to herein as "classes" that can be instantiated to form the types. Thus, the class library may be of types the represent useful functionality for a wide assortment of applications. In one example, the runtime environment contains a .NET framework, and the types 110 are one or more .NET class libraries. In this case, the runtime environment is the Common Language Runtime or "CLR". However, the principles described herein are not limited to the runtime environment 101 being the Common Language Runtime.

The principles described herein can be used for any runtime environment that defines a type upon creation of a type, and thereafter allows the type to be shared in immutable form amongst multiple applications that use the runtime environment. Examples of such other runtime environments include Objective-C and Swift and the runtimes associated with the C and C++ programming languages. However, the principles described herein are not limited to currently existing runtime environments, but may extend to runtime environments that may be created even after the filing of this patent application.

The interface casting interface 120 allows a subject interface to be supplied to a type managed by the runtime environment 101. The interface casting interface 120 may be provided by the runtime environment 101 itself and may be shared for multiple or all of the types managed by the runtime environment 101. For instance, in FIG. 1, perhaps the interface casting interface 120 is used to supply interfaces to any of the types 110 that are managed by the runtime environment 101. In that case, the identity of the type for which the interface and implementation are being supplied will be identified through the interface casting interface.

Alternatively, each type may have an associated unique interface casting interface, in which case the use of the interface casting interface itself implies the identity of the type for which the interface and its implementation are being added. The interface casting interface may be provided by the runtime environment itself, or may be provided external to the runtime environment.

Figure 2:
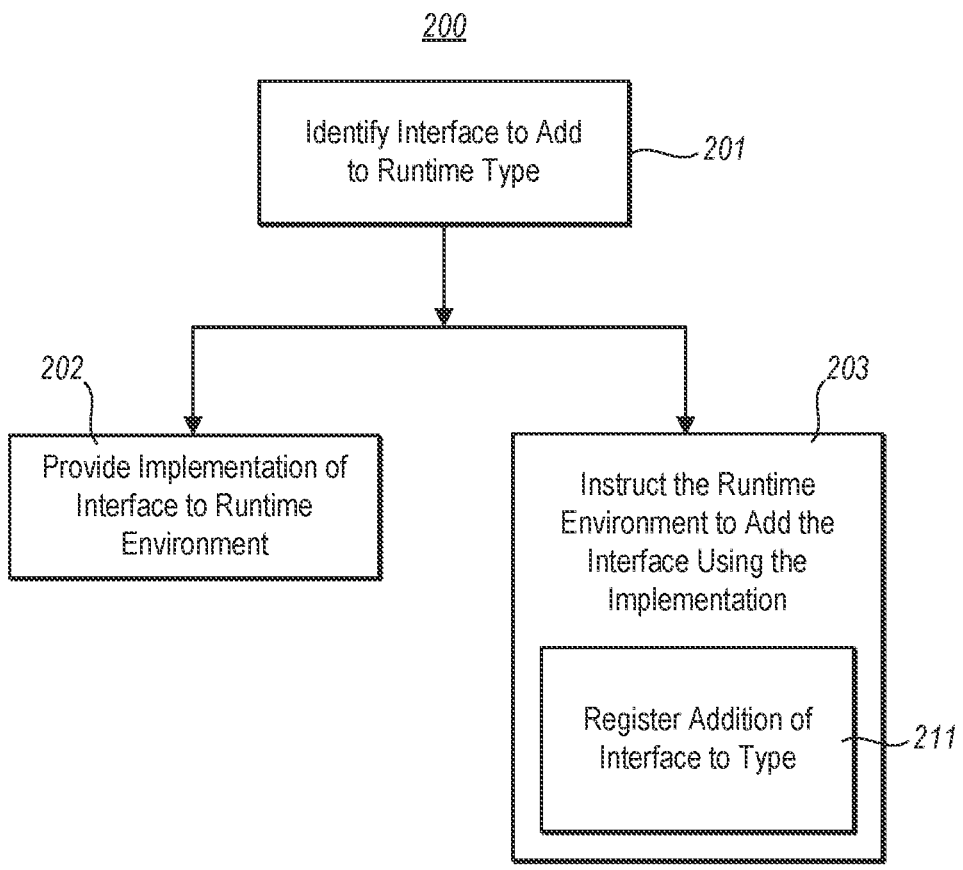
FIG. 2 illustrates a flowchart of a method for a computing system that is external to a runtime environment to extend a type that is managed by a runtime environment, in accordance with the principles described herein.

FIG. 2 illustrates a flowchart of a method 200 for a computing system that is external to a runtime environment to extend a type that is managed by a runtime environment, in accordance with the principles described herein. The method 200 may be performed by, for instance, the external component 130 of FIG. 1. In a subject example, the external component 130 performs the method 200 in order to extend the type 111 by supplying the subject interface 132 to the type 111. Accordingly, the method 200 will now be described with reference to the environment 100 of FIG. 1.

Figure 3:
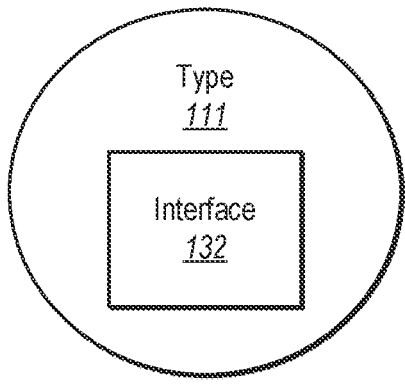
FIG. 3 illustrates a type with a supplied interface, which represents a state after a subject interface is cast to the type.

The method 200 includes identifying a subject interface to supply to a type that is managed by a runtime environment (act 201). As an example, with reference to FIG. 1 (referred to as the "subject example" in this description), suppose that the external component 130 identifies that a subject interface 132 is to be supplied to the type 111 that is managed by the runtime environment 101. FIG. 3 illustrates the type 111 with an supplied 132, which represents the type 111 after the interface 132 is supplied. However, at this point in the subject example, the external component 130 merely identifies that the interface 132 is to be supplied to the type 111.

Figure 4:
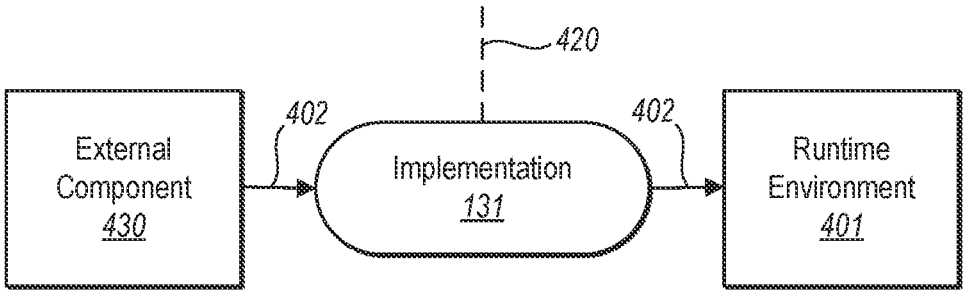
FIG. 4 illustrates an external component providing an implementation of the interface through an interface casting interface to a runtime environment.

Referring back to FIG. 2, the external component then provides an implementation of the interface to the runtime environment (act 202). In the subject example, this is done by the external component 130 providing the implementation 131 for the interface 132 through the interface casting interface 120 to the runtime environment 101. Referring to FIG. 4, an external component 430 provides (as represented by arrows 402) the implementation 131 of the interface through an interface casting interface 420 to the runtime environment 401. The external component 430, the interface casting interface 420, and the runtime environment 401 are examples of the respective external component 130, interface casting interface 120 and runtime environment 101 of FIG. 1.

The implementation 131 is structured to be executable by the runtime environment 401 such that if executed, the execution causes the interface 132 to be executed as an interface of the type 111. Alternatively, or in addition, the implementation 131 is structured such that the runtime environment can use the implementation to execute the interface 132 at runtime when that interface is called as an interface of the type 111. In either case, the interface is referred to herein as being "cast" to the type 111.

Figure 5:
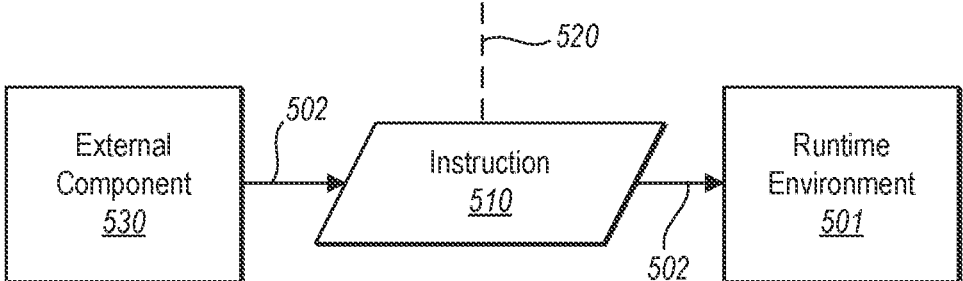
FIG. 5 illustrates an external component providing an instruction to supply the subject interface through an interface casting interface to the runtime environment.

Returning back to FIG. 2, the external component instructs the runtime environment to supply the subject interface to the type using the implementation (act 203). In the subject example, this is done by the external component 130 also providing an instruction through the interface casting interface 120 to the runtime environment 101. Referring to FIG. 5, an external component 530 provides (as represented by arrows 502) an instruction 510 to supply the subject interface through an interface casting interface 520 to the runtime environment 501. The external component 530, the interface casting interface 520, and the runtime environment 501 are examples of the respective external component 130, interface casting interface 120 and runtime environment 101 of FIG. 1. In addition, the external component 530, the interface casting interface 520, and the runtime environment 501 are examples of the respective external component 430, interface casting interface 420 and runtime environment 401 of FIG. 4.

The instruction 510 is structured to be executable by the runtime environment 501 such that if executed, the interface 132 is cast as an available interface of the type 111. As an example, the instruction could include an instruction to register the supplying of the subject interface to the type with the runtime environment (act 211). Thereafter, when any entity uses the type 111, that entity may use the interface 132 from that type 111, since the interface 132 is registered in the runtime environment for that type 111, and/or since the runtime environment has access to the implementation 131 of the interface 132.

Notice in FIG. 2 that the acts 202 and 203 are illustrated in parallel. This is merely to symbolize that the broader principles described herein are not limited to any temporal ordering between the providing of the implementation (act 202) and the instruction to supply the subject interface (act 203). They may occur simultaneously in a single function call through the interface casting interface 120. On the other hand, they may occur at different times through different function calls through the interface casting interface 120.

Figure 6:
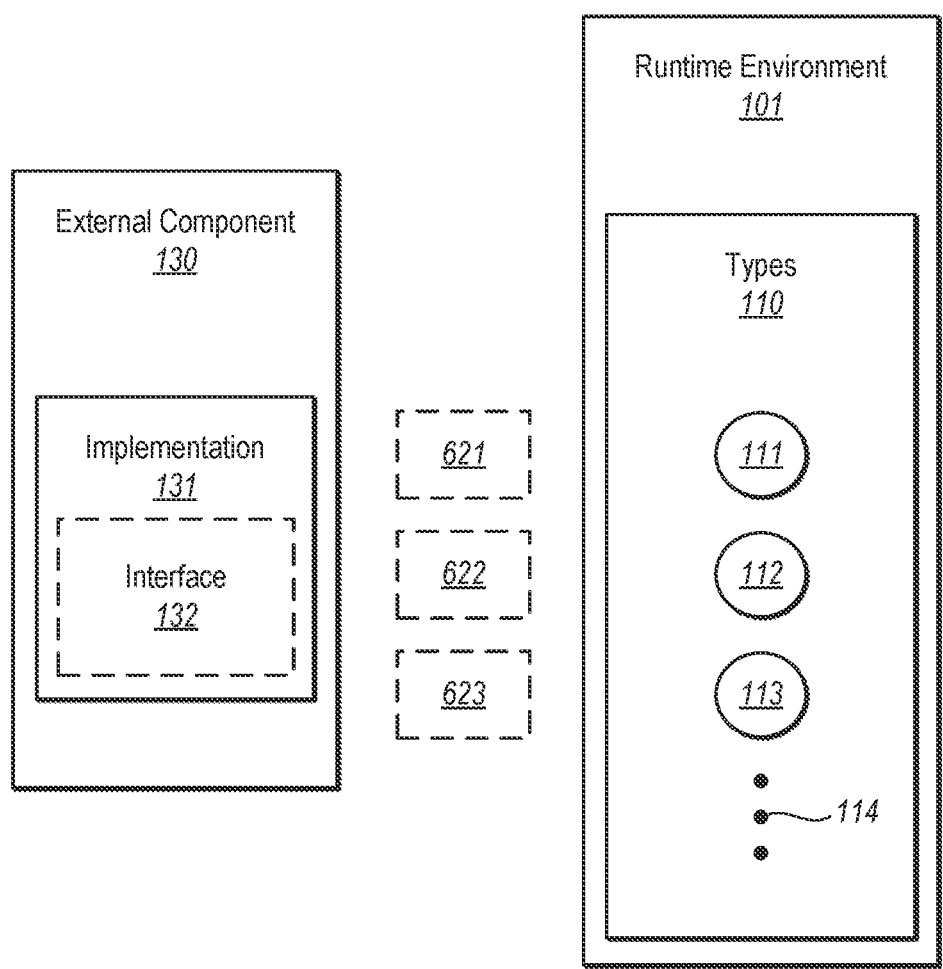
FIG. 6 illustrates an alternative environment which is similar to the environment of FIG. 1, except that rather than there being a single interface casting interface for multiple types, each type has a corresponding interface casting interface.

As previously mentioned, the interface casting interface 120 may be shared for multiple or all of the types managed by the runtime environment 101. Alternatively, each type may have an associated unique interface casting interface, in which case the use of the interface casting interface itself implies the identity of the type for which the interface and its implementation are being supplied. The interface casting interface may be provided by the runtime environment itself, or may be provided from external to the runtime environment. For example, FIG. 6 illustrates an alternative environment 600 which is similar to the environment 100 of FIG. 1, except that rather than there being a single interface casting interface 120 for multiple types 110, each type 110 has a corresponding interface casting interface. For instance, type 111 has interface casting interface 621, type 112 has interface casting interface 622, and type 113 has interface casting interface 623. To supply the subject interface to the type as in the subject example, the external component 130 would use the interface casting interface 621 for the type 111.

Figure 7:
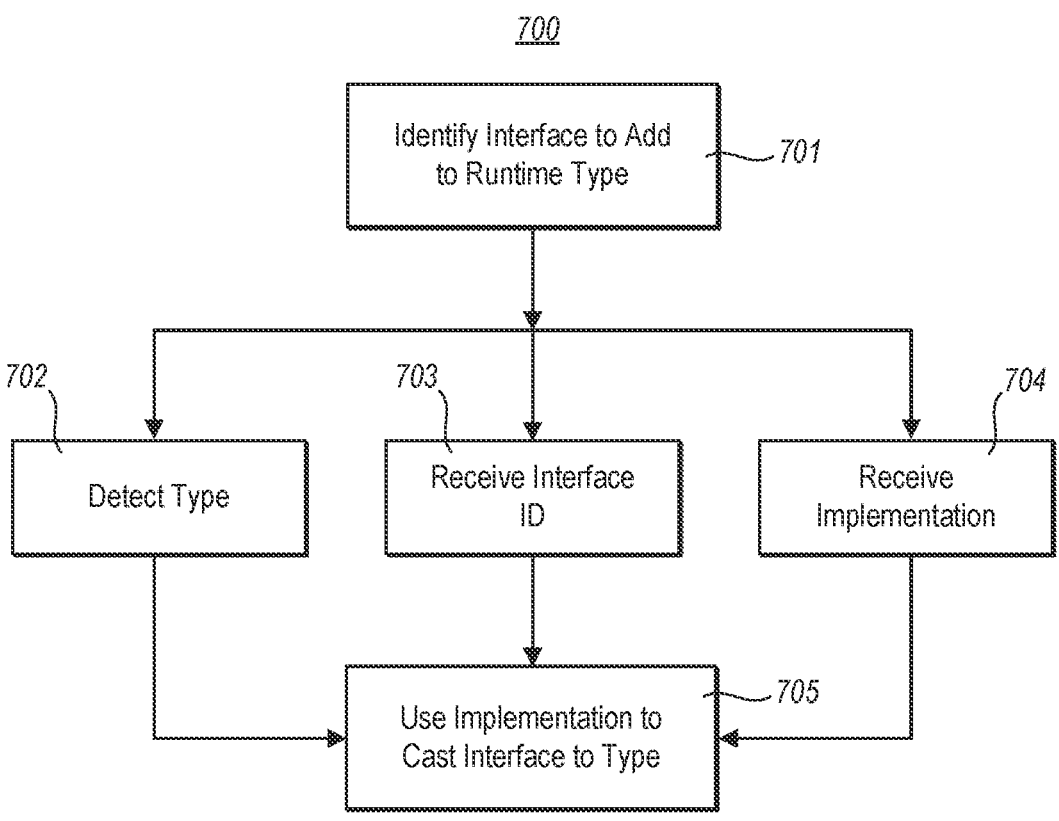
FIG. 7 illustrates a flowchart of a method for a runtime environment to allow a computing entity to supply a subject interface to a particular type managed by the runtime environment, in accordance with the principles described herein.

FIG. 2 is described mostly from the viewpoint of what the external component 130 does. However, the runtime environment 101 likewise performs actions to support the method 200 of FIG. 2. As an example, FIG. 7 illustrates a flowchart of a method 700 for a runtime environment to allow a computing entity to supply a subject interface to a particular type managed by the runtime environment. In accordance with the principles described herein, the interface is supplied to the type by the external component and without the type itself taking action. As the method 700 of FIG. 7 may be performed by the runtime environment 101 of FIGS. 1 and 6, the method 700 of FIG. 7 will now be described with frequent reference to FIGS. 1 and 6.

The method 700 includes exposing an interface casting interface for a plurality of types managed by the runtime environment including the particular type (act 701). In the example of FIG. 1, the runtime environment 101 exposes the interface casting interface 120. In the subject example, the external component 130 then uses the interface casting interface 120 to supply a subject interface 132 to the type 111, so that it and other external components can thereafter use the interface 132 as a new interface of the type 111. In the example of FIG. 6, the external component 130 uses the interface casting interface 621 of the type 111 to supply the subject interface to the type.

In FIG. 7, the method 700 then includes detecting that an interface casting interface of the particular type has been called (act 702). In the subject example, the runtime environment 101 would detect the call identifying the type placed by the external component using the interface casting interface 120. In the case of FIG. 6, the runtime environment 101 would detect the call into the interface casting interface 621 that corresponds to the type 111.

The method 700 also includes receiving via the interface casting interface an identification of a subject interface to supply to the particular type (act 703) as well as receiving an implementation of the interface (act 704). Although not required, the identification of the type (act 702), the identification of the interface to supply to the type (act 703), and the providing of the implementation (act 704) may be performed in a single function call. The method 700 then includes using the implementation of the interface to supply the subject interface to the particular type (act 705). In the subject example, the runtime environment receives the implementation via the interface casting interface 120 of FIG. 1 or the interface casting interface 621 of FIG. 6, and executes the implementation in order to cast the interface to the type 111.

Accordingly, the principles described herein describe a mechanism to cast a subject interface to a type from a component that is external to the runtime environment that manages the type. The method 200 may be repeated many times to provide robust addition of functionality to the types 110 managed by the runtime environment. For example, the external component 130 may cast the same interface 132 not only to the type 111, but to others of the types 110. Likewise, other external components may cast yet other interfaces to the types 110. Thus, any single type (such as type 111) may have multiple interfaces cast to them where the implementations for those interfaces are provided by perhaps different external components.

Figure 8:
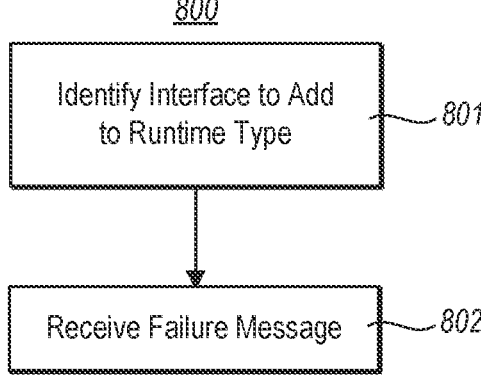
FIG. 8 illustrates a flowchart of a method that may be performed prior to the method of FIG. 2.

In one embodiment, the method 200 is performed as a fallback in case a first attempt to invoke the interface fails. For instance, in the subject example, perhaps the external component 130 first tries to invoke the interface 132 on the type 111, and receives a failure message, prior to initiating casting of the interface 132. FIG. 8 illustrates a flowchart of a method 800 that may be performed prior to the method 200. The method 800 includes attempting to invoke the interface on the type (act 801). The type may then attempt and fail to invoke the interface, and may even attempt to cast the interface onto itself and fail. In response, the external component receives a failure message (act 802). Thereafter, the method 200 may be performed. This allows the method 200 to be backwards compatible to continue to allow types to cast interfaces onto themselves. Thus, the external component only attempts to cast as a fallback position.

Because the principles described herein are performed in the context of a computing system, some introductory discussion of a computing system will be described with respect to FIG. 9. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
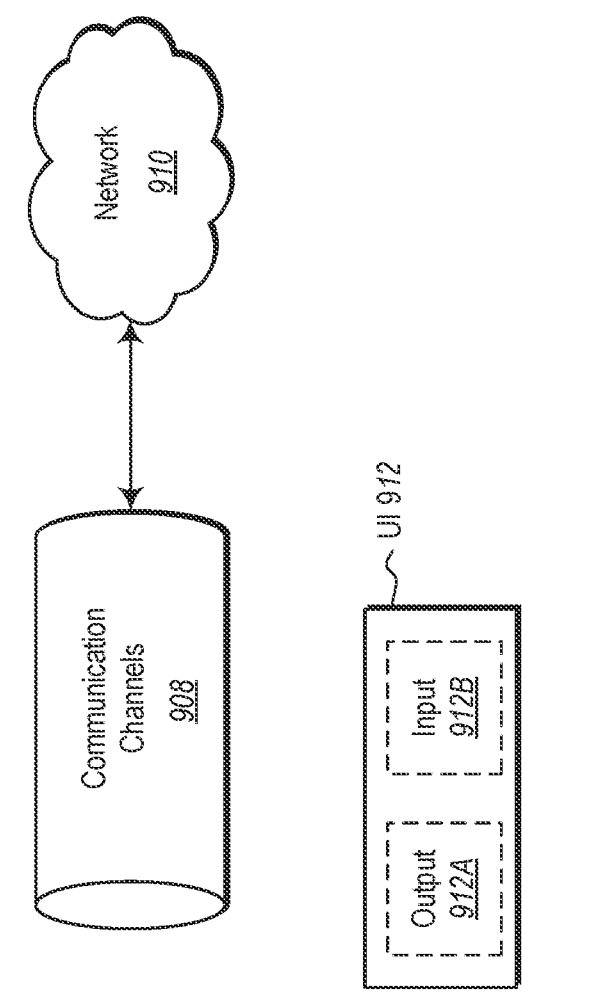
FIG. 9 illustrates an example computing system in which the principles described herein may be employed.
Figure 9:
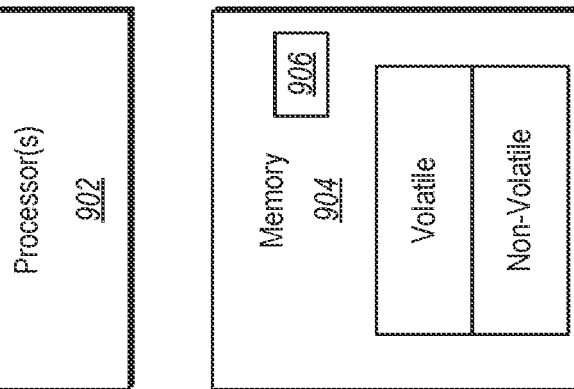

As illustrated in FIG. 9, in its most basic configuration, a computing system 900 includes at least one hardware processing unit 902 and memory 904. The processing unit 902 includes a general-purpose processor. Although not required, the processing unit 902 may also include a field programmable gate array (FPGA), an application specific integrated circuit (ASIC), or any other specialized circuit. In one embodiment, the memory 904 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 900 also has thereon multiple structures often referred to as an "executable component". For instance, the memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface system 912 for use in interfacing with a user. The user interface system 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, virtual or augmented reality, holograms and so forth. Examples of input mechanisms 912B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that extends a software development framework that includes a runtime environment, the computing system comprising:

one or more processors; and one or more hardware storage devices that store instructions that are executable by the one or more processors to cause the computing system to:

identify a plurality of originally immutable types that are managed by the runtime environment, wherein the plurality of originally immutable types are statically defined, and wherein the software development framework includes a framework class library that defines the plurality of originally immutable types;

cause the runtime environment to expose an interface casting interface, which is structured to enable a non-runtime component to communicate with the runtime environment, the non-runtime component being external relative to the software development framework;

receive, through the interface casting interface, a supplied interface that is supplied by the non-runtime component and that is structured to extend the plurality of originally immutable types, wherein:

the supplied interface is supplied to the runtime environment by the non-runtime component without waiting for the runtime environment to extend the plurality of originally immutable types and without the plurality of originally immutable types itself taking action, extension of the plurality of originally immutable types via the supplied interface enables other computing entities to also use the plurality of originally immutable types via the supplied interface, and the extension is facilitated by the non-runtime component;

determine that the supplied interface is to be added to the plurality of originally immutable types;

instruct the runtime environment to supply the supplied interface to the plurality of originally immutable types, resulting in extension of the plurality of originally immutable types, such that the plurality of originally immutable types are enhanced to include new functionality; and provide the other computing entities with access to the plurality of originally immutable types.

2. The computing system of claim 1, wherein the interface casting interface is shared by both a first originally immutable type and a second type, which is also managed by the runtime environment.

3. The computing system of claim 1, wherein instructing the runtime environment to supply the supplied interface to the plurality of originally immutable types includes registering the supplied interface with the runtime environment.

4. A method for extending a software development framework that includes a runtime environment, the method comprising:

identifying a plurality of originally immutable types managed by the runtime environment, wherein the plurality of originally immutable types are statically defined, and wherein the software development framework includes a framework class library that defines the plurality of originally immutable types;

causing the runtime environment to expose an interface casting interface, which is structured to enable a non-runtime component to communicate with the runtime environment, the non-runtime component being external relative to the software development framework;

receiving, through the interface casting interface, a supplied interface that is supplied by the non-runtime component and that is structured to extend the plurality of originally immutable types, wherein:

the supplied interface is supplied to the runtime environment by the non-runtime component without waiting for the runtime environment to extend the plurality of originally immutable types and without the plurality of originally immutable types taking action, extension of the plurality of originally immutable types via the supplied interface enables other computing entities to also use the plurality of originally immutable types via the supplied interface, and the extension is facilitated by the non-runtime component;

determining that the supplied interface is to be added to the plurality of originally immutable types;

instructing the runtime environment to supply the supplied interface to the plurality of originally immutable types, resulting in extension of the plurality of originally immutable types, such that the plurality of originally immutable types are enhanced to include new functionality; and providing the other computing entities with access to the plurality of originally immutable types.

5. The method of claim 4, wherein the runtime environment includes multiple types, and wherein the plurality of originally immutable types are one of the multiple types.

6. The method of claim 4, wherein the plurality of originally immutable types are a part of a class library shared by multiple applications that use the runtime environment.

7. The method of claim 4, wherein the plurality of originally immutable types are shareable in immutable form amongst multiple applications that use the runtime environment.

8. The method of claim 4, wherein said method is implemented by the non-runtime component.

9. The method of claim 4, wherein the supplied interface is structured to be executable by the runtime environment such that, if executed, said execution causes the supplied interface to be executed as an interface of the plurality of originally immutable types.

10. The method of claim 4, wherein the supplied interface is cast to the plurality of originally immutable types.

11. The method of claim 4, wherein said method is implemented by the non-runtime component that is external relative to the runtime environment.

12. A method for extending a software development framework that includes a runtime environment, the method being implemented by a non-runtime component and comprising:

identifying a plurality of originally immutable types managed by the runtime environment, wherein the plurality of originally immutable types are statically defined, and wherein the software development framework includes a framework class library that defines the plurality of originally immutable types;

causing the runtime environment to expose an interface casting interface, which is structured to enable the non-runtime component to communicate with the runtime environment, the non-runtime component being external relative to the software development framework;

receiving, through the interface casting interface, a supplied interface that is supplied by the non-runtime component and that is structured to extend the plurality of originally immutable types despite the plurality of originally immutable types being statically defined, wherein:

the supplied interface is supplied to the runtime environment by the non-runtime component without waiting for the runtime environment to extend the plurality of originally immutable types and without the plurality of originally immutable types taking action, extension of the plurality of originally immutable types via the supplied interface enables other computing entities to also use the plurality of originally immutable types via the supplied interface, and the extension is facilitated by the non-runtime component;

determining that the supplied interface is to be added to the plurality of originally immutable types;

instructing the runtime environment to implement the supplied interface for the plurality of originally immutable types, resulting in extension of the plurality of originally immutable types, such that the plurality of originally immutable types are enhanced to include new functionality; and providing the other computing entities with access to the plurality of originally immutable types.

13. The method of claim 12, wherein the runtime environment includes multiple types, and wherein the plurality of originally immutable types are one of the multiple types.

14. The method of claim 12, wherein the plurality of originally immutable types are a part of a class library shared by multiple applications that use the runtime environment.

15. The method of claim 12, wherein a single function call is performed to: (i) identify the plurality of originally immutable types, (ii) identify the interface casting interface, and (iii) provide the supplied interface to the plurality of originally immutable types.

16. The method of claim 12, wherein the method includes:

prior to the plurality of originally immutable types being extended and prior to the supplied interface being made available to the plurality of originally immutable types:

identifying an attempt to invoke the supplied interface on the plurality of originally immutable types;

identifying an attempt made by the plurality of originally immutable types to cast the supplied interface on itself despite the supplied interface not currently being made available to the plurality of originally immutable types; and transmitting a failure notice to the non-runtime component, the failure notice indicating failure to invoke the supplied interface.

17. The method of claim 12, wherein the plurality of originally immutable types are managed by the runtime environment.

18. The method of claim 12, wherein the supplied interface is registered with the runtime environment.

19. The method of claim 12, wherein the plurality of originally immutable types are instantiated code.

20. The method of claim 12, wherein the supplied interface is executable as an interface of at least one of the originally immutable types.

\*   \*   \*   \*   \*